United States Patent
Wiesner et al.

(10) Patent No.: US 10,710,304 B2
(45) Date of Patent: Jul. 14, 2020

(54) APPARATUS FOR PRODUCING A THREE-DIMENSIONAL WORK PIECE WITH PROCESS TEMPERATURE CONTROL

(71) Applicant: SLM Solutions Group AG, Luebeck (DE)

(72) Inventors: Andreas Wiesner, Luebeck (DE); Christiane Thiel, Luebeck (DE); Daniel Brueck, Luebeck (DE); Isabell Huebinger, Luebeck (DE)

(73) Assignee: SLM Solutions Group AG, Luebeck (DE)

(*) Notice: Subject to any disclaimer, the term of this patent is extended or adjusted under 35 U.S.C. 154(b) by 252 days.

(21) Appl. No.: 15/812,353

(22) Filed: Nov. 14, 2017

(65) Prior Publication Data

US 2018/0133964 A1 May 17, 2018

(30) Foreign Application Priority Data

Nov. 14, 2016 (EP) .................................... 16198718

(51) Int. Cl.
*B29C 64/264* (2017.01)
*B29C 64/153* (2017.01)
(Continued)

(52) U.S. Cl.
CPC .......... *B29C 64/264* (2017.08); *B22F 3/1055* (2013.01); *B29C 35/08* (2013.01);
(Continued)

(58) Field of Classification Search
CPC ..... B29C 64/264; B29C 64/153; B29C 35/08; B33Y 10/00; B33Y 30/00; B33Y 50/02;
(Continued)

(56) References Cited

U.S. PATENT DOCUMENTS 3,923,383 A * 12/1975 Engel ....................... G02B 5/08
359/845
5,150,253 A * 9/1992 Watanuki ............. G02B 7/1815
126/662
(Continued)

FOREIGN PATENT DOCUMENTS

EP 1793979 B1 6/2007
EP 2335848 A1 6/2011
(Continued)

OTHER PUBLICATIONS

European Search Report, EP16198718.5, SLM Solutions Group AG, dated May 17, 2017, 8 pages.
(Continued)

*Primary Examiner* — Nahida Sultana
(74) *Attorney, Agent, or Firm* — Taft Stettinius & Hollister LLP (57) ABSTRACT

An apparatus for producing a three-dimensional work piece comprises a process chamber accommodating a carrier for receiving a raw material powder and an irradiation device for selectively irradiating electromagnetic or particle radiation onto the raw material powder applied onto the carrier in order to produce the work piece from said raw material powder by an additive layer construction method, the irradiation device comprising at least one radiation source and at least one optical unit with a plurality of optical elements. A heat transfer arrangement is configured to transfer heat generated by a heat source to the at least one optical unit of the irradiation device. The apparatus further comprises a control unit configured to control the heat transfer arrangement so as to adjust a temperature of the at least one optical unit of the irradiation device.

13 Claims, 2 Drawing Sheets

(51) Int. Cl.
*B29C 35/08* (2006.01)
*B22F 3/105* (2006.01)
*B33Y 30/00* (2015.01)
*B33Y 10/00* (2015.01)

(52) U.S. Cl.
CPC ............ *B29C 64/153* (2017.08); *B33Y 10/00* (2014.12); *B33Y 30/00* (2014.12); *B22F 2003/1056* (2013.01); *B22F 2999/00* (2013.01); *Y02P 10/295* (2015.11)

(58) Field of Classification Search
CPC .... B33Y 40/00; B22F 3/1055; B22F 2999/00; B22F 2003/1056; Y02P 10/295
See application file for complete search history.

(56) References Cited

U.S. PATENT DOCUMENTS

| | | | | |
|---|---|---|---|---|
| 5,993,721 | A * | 11/1999 | Kurihara | B29C 49/20 264/402 |
| 6,925,346 | B1 * | 8/2005 | Mazumder | B23K 26/032 700/119 |
| 8,282,377 | B2 | 10/2012 | Higashi et al. | |
| 2002/0011097 | A1 | 1/2002 | Kuderer et al. | |
| 2003/0148222 | A1 * | 8/2003 | Bowman | B81C 99/0095 430/312 |
| 2005/0015175 | A1 * | 1/2005 | Huang | B29C 41/02 700/121 |
| 2008/0138513 | A1 * | 6/2008 | Perret | B22F 3/1055 427/189 |
| 2008/0151341 | A1 * | 6/2008 | Perret | B33Y 30/00 359/196.1 |
| 2009/0295039 | A1 | 12/2009 | Fruth et al. | |
| 2011/0061591 | A1 * | 3/2011 | Stecker | B22F 3/1055 118/663 |
| 2011/0122381 | A1 | 5/2011 | Hickerson et al. | |
| 2016/0114531 | A1 * | 4/2016 | Chuang | B33Y 10/00 264/497 |
| 2018/0085826 | A1 * | 3/2018 | Luo | F24H 3/04 |

FOREIGN PATENT DOCUMENTS

| | | |
|---|---|---|
| EP | 3067132 A1 | 9/2016 |
| JP | H07227688 A | 8/1995 |
| JP | 2010-046694 A | 3/2010 |
| JP | 2016-502596 A | 1/2016 |
| WO | 2016102970 A1 | 6/2016 |

OTHER PUBLICATIONS

China National Intellectual Property Administration, First Office Action in corresponding application No. 201711124997.1, dated Jul. 3, 2019, 14 pp.
Summary of Notice of Reasons for Rejection issued in corresponding Japanese application No. 2017-217967, dated Jan. 7, 2020, 6 pp.

\* cited by examiner

FIG 1

FIG 2

APPARATUS FOR PRODUCING A THREE-DIMENSIONAL WORK PIECE WITH PROCESS TEMPERATURE CONTROL

The present invention relates to an apparatus for producing a three-dimensional work piece by irradiating layers of a raw material powder with electromagnetic or particle radiation. Furthermore, the invention relates to a method of operating an apparatus of this kind.

Powder bed fusion is an additive layering process by which pulverulent, in particular metallic and/or ceramic raw materials, can be processed to three-dimensional work pieces of complex shapes. To that end, a raw material powder layer is applied onto a carrier and subjected to laser radiation in a site selective manner in dependence on is the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopedic prostheses, on the basis of CAD data.

An apparatus for producing moulded bodies from pulverulent raw materials by a powder bed fusion process is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is connected to a shielding gas circuit comprising a supply line via which a shielding gas may be supplied to the process chamber in order to establish a protective gas atmosphere within the process chamber.

An irradiation device which may, for example, be employed in an apparatus for producing three-dimensional work pieces by irradiating pulverulent raw materials is described in EP 2 335 848 B1. The irradiation device comprises a laser source and an optical unit. The optical unit which is supplied with a laser beam emitted by the laser source comprises a beam expander and a scanner unit. Within the scanner unit, diffractive optical elements which may be folded into the beam path in order to split the laser beam into a plurality of laser sub-beams are arranged in front of a deflection mirror for deflecting the laser sub-beams. The laser beam or the laser sub-beams emitted by the scanner unit are supplied to an objective lens.

The invention is directed at the object of providing an apparatus which allows the generation of a high-quality three-dimensional work piece by irradiating layers of raw material powder with electromagnetic or particle radiation. Furthermore, the invention is directed at the object of providing a method of operating an apparatus of this kind.

These objects are addressed by an apparatus for producing a three-dimensional work piece as defined in claim 1 and a method of operating an apparatus for producing a three-dimensional work piece as defined in claim 14.

An apparatus for producing a three-dimensional work piece comprises a process chamber accommodating a carrier for receiving a raw material powder. The carrier may be a rigidly fixed carrier having a surface onto which the raw material powder is applied in order to be subjected to electromagnetic or particle radiation. Preferably, however, the carrier is designed to be displaceable in vertical direction, so that, with increasing construction height of a work piece, as it is built up in layers from the raw material powder, the carrier can be moved downwards in the vertical direction. The raw material powder applied onto the carrier within the process chamber is preferably a metallic powder, in particular a metal alloy powder, but may also be a ceramic powder or a powder containing different materials. The powder may have any suitable particle size or particle size distribution. It is, however, preferable to process powders of particle sizes <100 µm.

The apparatus further comprises an irradiation device for selectively irradiating electromagnetic or particle radiation onto the raw material powder on the carrier in order to produce the work piece from said raw material powder by an additive layer construction method. Hence, the raw material powder applied onto the carrier may be subjected to electromagnetic or particle radiation in a site-selective manner in dependence on the desired geometry of the work piece that is to be produced.

The irradiation device comprises at least one radiation source and at least one optical unit with a plurality of optical elements which is preferably configured for guiding and/or processing a radiation beam emitted by the at least one radiation source. For example, the irradiation device may comprise only one radiation source and/or only one optical unit. Alternatively, the irradiation device may comprise a plurality of radiation sources and/or a plurality of optical units. In case the irradiation device comprises a plurality of radiation sources, a separate optical unit comprising a plurality of optical elements may be associated to each of the plurality of radiation sources. The at least one radiation source may be a laser source, for example a diode pumped Ytterbium fibre laser. Further, the plurality of optical elements may, for example, include a beam expander for expanding a radiation beam emitted by the at least one radiation source, a scanner and an object lens. Alternatively, the plurality of optical elements may comprise a beam expander including a focusing optic and a scanner unit. The scanner unit preferably comprises a diffractive optical element and/or a deflection mirror. By means of the scanner unit, the position of a focus of the radiation beam both in the direction of the beam path and in a plane perpendicular to the beam path can be changed and adapted.

The apparatus further comprises a heat transfer arrangement configured to transfer heat generated by a heat source to the at least one optical unit of the irradiation device. For example, the heat source may be provided in the form of the at least one radiation source or in the form of any other component of the irradiation device. It is, however, also conceivable that the heat source is provided in the form of a separate heater, such as an electrical resistor which generates heat upon being supplied with electrical energy. Specifically, a plurality of separate heaters may be provided, wherein each of the plurality of separate heaters may be assigned to one of the at least one optical unit of the irradiation device.

Further, the apparatus is provided with a control unit configured to control the heat transfer arrangement so as to adjust a temperature of the at least one optical unit of the irradiation device. Specifically, the control unit may be configured to control the heat transfer arrangement so as to adjust a temperature of the plurality of optical elements of the at least one optical unit of the irradiation device. The control unit may be provided separately from or integrated into a central control unit of the apparatus. Specifically the control unit may be configured to provide control signals to actuators or control elements of the apparatus which may be configured to adjust the temperature of the at least one optical unit of the irradiation device.

Usually, during operation of the apparatus for producing a three-dimensional work piece, heat is generated by the radiation source of the irradiation device, thereby increasing an operating temperature of the irradiation device which mainly depends on an output power of the radiation source. Thus, the irradiation device is usually subjected to a highly varying operating temperature. Specifically, at the beginning of a production process carried out by the apparatus, the operating temperature of the irradiation device is relatively low. The heat generated by the radiation source is transferred to the plurality of optical elements of the optical unit. Further, heat is generated in the plurality of optical elements upon interacting with the electromagnetic or particle radiation emitted by the radiation source. To that end, upon irradiating the raw material powder onto the carrier, the irradiation device is also subjected to heat radiation emitted by portions of the at least partially formed work piece being irradiated with electromagnetic or particle radiation. This heat radiation induced heating of the irradiation device typically depends on the distance to portions of the work piece being irradiated with electromagnetic or particle radiation and their temperature. Consequently, optical elements of an irradiation unit or, in case the irradiation device comprises a plurality of radiation sources and units, irradiation units which are disposed closer to regions subjected to a high electromagnetic or particle radiation of the work piece to be formed, so called "irradiation hot spots", are heated more as such disposed farther away therefrom. For example, optical elements of an irradiation unit or irradiation units which are disposed above irradiation hot spots formed in the raw material powder bed are heated more by heat radiation than those disposed above unprocessed raw material powder. This further results in an uneven heating and varying operating temperatures within the irradiation device.

However, as a result of the above described heating of the irradiation device, particularly due to thermal expansion, the optical properties of the plurality or optical elements change in dependence on the operating temperature of the irradiation device. For example, the refractive index of an optical fibre, a lens or another optical element of the optical unit or a geometry in particular the curvature radius of the lens forming an optical element of the optical unit depend on its operating temperature. Furthermore, also electrical and electro mechanical components of the irradiation device typically are provided with temperature dependent properties. Thus, due to varying operating temperatures, an uneven heating and differing temperature dependent properties of components of the irradiation device, the apparatus is usually subjected to inaccuracies and decalibration of the irradiation device during operation.

By means of the control unit, the present invention enables that a temperature, i.e. an operating temperature, of the at least one optical unit is adjusted in order to avoid an uneven heating of the plurality of optical elements and to maintain the operating temperature thereof substantially constant. In other words, the control unit enables that the operating temperature of the at least one optical unit of the irradiation device can be set in a controlled manner. Specifically, by means of the heat transfer arrangement and the control unit, the present invention enables that a homogenous temperature distribution within the optical unit in particular across the plurality of optical elements is achieved. In this way, the impact of differing temperature dependent properties of the plurality of optical elements of the at least one optical unit can be reduced, thereby avoiding inaccuracies and decalibration of the irradiation device during operation. As a result, the operation of the irradiation device can be controlled more accurately and a three-dimensional work piece which meets particularly high quality standards can be produced.

The apparatus may comprise a plurality of heat transfer arrangements each of which is assigned to at least one optical unit of the irradiation device. In this way, a temperature of the at least one optical unit assigned to one of the plurality of heat transfer arrangements may be selectively adjusted. The plurality of heat transfer arrangements may be controlled by the same control unit.

In a further development, the control unit may be configured to control the heat transfer arrangement such that, when the temperature of the at least one optical unit of the irradiation device falls below a temperature set value, the heat generated by the heat source may be transferred to the at least one optical unit of the irradiation device so as to raise the temperature of the at least one optical unit of the irradiation device. Further, the control unit may be configured to control the heat transfer arrangement such that, when the temperature of the at least one optical unit of the irradiation device exceeds or equals the temperature set value, the transfer of the heat generated by the heat source to the at least one optical unit of the radiation unit may be shut off.

The temperature set value preferably is a predefined operating temperature of the at least one optical unit of the irradiation device which may correspond to an optimal operating temperature of the at least one optical unit of the irradiation device at which the irradiation device can be operated with high accuracy in order to produce high-quality work pieces. Thus, by setting the temperature of the at least one optical unit of the irradiation devise to the temperature set value, the control unit ensures that the temperature of the at least one optical unit of the irradiation device is increased until it reaches its optimal operating temperature. Then, after the optimal operating temperature is obtained, the transfer of heat to the at least one optical unit of the irradiation device may be shut off and the temperature thereof may be maintained substantially constant at the set temperature value during the production process.

For example, for maintaining the temperature of the at least one optical unit of the irradiation device at a substantially constant value, the heat transfer arrangement may be further configured to transfer cooling energy generated by a cooling energy source to the at least one optical unit of the irradiation device. The control unit is configured to control the heat transfer arrangement such that, when the temperature of the at least one optical unit of the irradiation device exceeds or equals the temperature set value, the cooling energy generated by the cooling energy source is transferred to the at least one optical unit of the irradiation device so as to adjust the temperature of the at least one optical unit of the irradiation device substantially to the temperature set value. As a result, by such a configuration, the apparatus can be operated at stable operating conditions in order to meet high accuracy standards is even over long operating periods.

For controlling the temperature of the at least one optical unit of the irradiation device, the control unit may be configured to control the heat transfer arrangement according to a feedback loop. This may involve providing at least one suitable temperature sensing means in the apparatus, e.g. close to at least one optical unit of the irradiation device.

Thus, the control unit may be configured to control the heat transfer arrangement in response to a control parameter transmitted from the at least one temperature sensing means to the control unit. The control parameter may be indicative of the temperature of the at least one optical unit of the irradiation device.

Further, the apparatus may be provided with a shielding gas supply system configured to supply a shielding gas to the process chamber. The shielding gas supply system may comprise a gas supply line for supplying gas to the process chamber and a gas discharge line for a discharging gas from the process chamber which may be connected to a shielding gas circuit. The gas supplied by the gas supply line may be an inert gas such as, for example, Argon, Nitrogen or the like. It is conceivable that the process chamber may be sealable against a surrounding atmosphere, in order to be able to maintain a controlled atmosphere therein. In this way, a protective gas atmosphere may be established within the process chamber to protect an irradiation area on the carrier from undesired reactions with the surrounding atmosphere and, typically, from reactions with oxygen. Further, via the gas discharge line shielding gas which, upon flowing through the process chamber, is loaded with particulate impurities such as, for example, procedural raw material powder particles and welding smoke particles may be withdrawn from the process chamber.

Further, the apparatus may comprise a further heat transfer arrangement configured to transfer heat to the shielding gas to be supplied to the process chamber. For generating heat to be transferred to the shielding gas to be supplied to the process chamber, the further heat transfer arrangement may comprise a further heat source configured to act on the shielding gas so as to raise the temperature thereof. The further heat source may be provided in the form of a further separate heater or a heat exchanger configured to raise the temperature of the shielding gas prior to entering the process chamber and/or in the process chamber and/or after leaving the process chamber.

The further heat transfer arrangement may further comprise a gas flow generating is device, such as a compressor, for supplying the shielding gas to the process chamber. Specifically, the gas flow generating device may be configured to adjust the flow rate of the shielding gas to and/or from the process chamber.

The control unit is preferably configured to control the further heat transfer arrangement so as to adjust the temperature of the shielding gas to be supplied to the process chamber. Specifically, the control unit may be configured to control the further heat source so as to adjust a heat flow transferred from the further heat source to the shielding gas to be supplied to the process chamber in accordance with an ongoing production process. Further, the control unit may be configured to control the gas flow generating device so as to further adjust the flow rate of the shielding gas to and/or from the process chamber in accordance with an ongoing production process. As a result, the control unit may be configured to adjust a temperature prevailing in the process chamber by means of the shielding gas supply system and the further heat transfer arrangement so as to control operating conditions within the process chamber.

In general, improper heating and/or cooling of the process chamber and, in particular of the raw material powder accommodated therein or of the at least partially formed work piece, may lead to problems such as creating high temperature gradients within the work piece. This may result in considerable internal stresses as well as varying material characteristics and thus to a decreasing product quality of the work piece to be produced. Therefore, carrier heating units are typically provided in the apparatus to counteract temperature gradients being formed in the work piece during the production process. Specifically, the carrier heating units are provided in or underneath the carrier and are configured to heat the carrier onto which the raw material powder is applied. However, as the work piece to be produced is build up in layers onto the carrier, a temperature of a partially formed work piece during the production process may significantly decrease from regions near the carrier to regions further away therefrom. In other words, with increasing build height of the work piece relative to the carrier, the temperature gradient further increases especially when viewed in a vertical direction relative to the carrier. Consequently, the work piece regions near the carrier may be maintained at a comparatively high temperature, whereas work piece regions near new layers being formed are comparatively cold.

On the other hand, situations may arise in which a temperature gradient in the work piece results from its geometry and undesired accumulation of heat in certain areas. In this case, cooling may be required to avoid significant temperature gradients in the piece which may also cause a decreasing product quality of the work piece to be produced.

By means of the shielding gas supply system and the further heat transfer arrangement which may be controlled by means of the control unit, the apparatus enables to provide a heating and/or cooling directly near or at the work piece being formed, since the shielding gas is typically supplied so as to stream along upper or near layers of the work piece being formed. In other words, by adjusting the temperature of the shielding gas to be supplied to the process chamber, a temperature prevailing within the process chamber, in particular in a region of an upper layer of raw material powder to be subjected to electromagnetic or particle radiation from the irradiation device, can be set so as to establish optimal operating conditions within the process chamber. As a result, temperature gradients along a work piece being formed can be avoided, thereby contributing to a production of a particularly high-quality three-dimensional work piece.

In order to control the temperature within the process chamber, the control unit may be configured to control the further heat transfer arrangement according to a feed-back loop. This may involve providing at least one suitable further temperature sensing means in the apparatus which may be configured to sense a temperature prevailing in the process chamber, in particular close to an irradiation area on the carrier, and/or in the gas supply line and/or gas discharge line. Thus, the control unit may be configured to control the further heat transfer arrangement in response to a further control parameter transmitted from the at least one further temperature sensing means to the control unit. Accordingly, the control parameter may be indicative of a temperature prevailing in the process chamber, in particular close to an irradiation area on the carrier, and/or in the gas supply line and/or in the gas discharge line.

Preferably the control unit is configured to control the further heat transfer arrangement such that, when the temperature prevailing in the process chamber falls below a further temperature set value, the temperature of the shielding gas to be supplied to the process chamber is raised and, when the temperature prevailing in the process chamber exceeds the further temperature set value, the temperature of the shielding gas to be supplied to the process chamber is lowered. For example, the control unit may be configured to lower the temperature of the shielding gas to be supplied to the process chamber by shutting off the heat transfer from the further heat transfer arrangement to the shielding gas to be supplied to the process chamber. The further temperature set value preferably is a predefined operating temperature within the process chamber which may correspond to an optimal operating temperature. Thus, by means of the control unit, the apparatus ensures that the temperature within the process chamber is raised and thereafter is maintained substantially constant at its optimal operating temperature.

To summarize, by such a configuration, the control unit of the apparatus may be suitable to control both the temperature of the at least one optical unit of the radiation device and the temperature prevailing in the process chamber, thereby allowing the production of a particularly high-quality three-dimensional work piece.

The temperature set value for the temperature of the at least one optical unit of the irradiation device may equal the further temperature set value for the temperature prevailing in the process chamber. Preferably, however, the temperature set value for the temperature of the at least one optical unit of the irradiation device is greater than the further temperature set value for the temperature prevailing in the process chamber. For example, the temperature set value for the temperature of the at least one optical unit of the irradiation device may be substantially 10 Kelvin greater than the further temperature set value for the temperature prevailing in the process chamber. Preferably the temperature set value for the temperature of the at least one optical unit of the irradiation device and the further temperature set value for the temperature prevailing in the process chamber are greater than a temperature prevailing in a surrounding atmosphere of the apparatus.

Further, the control unit may be configured to control the heat transfer arrangement and the further heat transfer arrangement such that a gradient of the temperature of the at least one optical unit of the irradiation device substantially equals a gradient of the temperature prevailing in the process chamber. In this way, the adjustment of the temperature of the optical unit of the irradiation device and the temperature prevailing in the process chamber can be performed in a coordinated manner between the irradiation device and the process chamber.

In a further development, the control unit may be configured to control the heat transfer arrangement such that the temperature of the at least one optical unit of the irradiation device is raised to the temperature set value when the apparatus is in a warm up mode. In this context, the "warm up mode" refers to an operating mode of the apparatus which is performed prior to a "processing mode" during which a three-dimensional work piece is produced by selectively irradiating electromagnetic or particle radiation onto the raw material powder applied onto the carrier. In other words, during the warm up mode, the apparatus is brought up to its operating temperature. Then, when the apparatus has obtained its operating temperature, the apparatus is switched into its processing mode to start the production of the three-dimensional work piece to be produced. Further, the control unit may be configured to control the heat transfer arrangement such that the temperature of the at least one optical unit of the irradiation device is maintained substantially constant at the temperature set value when the apparatus is in its processing mode. Additionally or alternatively, the control unit may be configured to control the further heat transfer arrangement such that the temperature prevailing in the process chamber is raised to the further temperature set value when the apparatus is in its warm up mode and the temperature prevailing in the process chamber is maintained substantially constant at the further temperature set value when the apparatus is in its processing mode. As a result, by such a configuration, the control unit ensures that the production of a three-dimensional work piece does not begin until optimal operating conditions are established in the apparatus so as to produce three-dimensional work pieces with high accuracy.

The heat transfer arrangement may comprise a heat transfer circuit in which a heat transfer fluid circulates. The heat transfer circuit may be thermally coupled to the heat source, in particular by means of a first heat exchanger, and to the at least one optical unit, in particular the plurality of optical elements, of the irradiation device, in particular by means of at least one second heat exchanger, so as to transfer the heat generated by the heat source to the at least one optical unit, in particular the plurality of optical elements of the at least one optical unit, of the irradiation device. In this context, the term "heat exchanger" refers to any component suitable to transfer heat to or receive heat from the heat transfer fluid flowing through the heat transfer circuit. For example, in order to thermally couple the plurality of optical elements of the at least one optical irradiation device to the heat transfer circuit, the heat transfer arrangement may comprise a plurality of second heat exchangers each of which is selectively assigned to one of the plurality of optical elements of the optical unit. It is, however, also conceivable that the heat transfer arrangement may comprise a plurality of second heat exchangers, wherein to each of the at least one optical unit only one of the plurality of second heat exchangers is assigned. By thermally coupling the plurality of optical elements of the at least one optical unit of the irradiation device to the heat transfer circuit, the heat transfer arrangement ensures a homogenously heating and/or a homogenous temperature level throughout the plurality of optical elements within the at least one optical unit as well as, in case the irradiation device comprises a plurality of optical units, across the plurality of optical units of the irradiation device.

The heat transfer circuit may comprise at least one distribution line connected to the at least one second heat exchanger and configured to selectively direct the heat transfer fluid circulating in the heat transfer circuit through the at least one second heat exchanger thermally coupled to the at least one optical unit, in particular to one of the plurality of optical elements of the at least one optical unit, of the irradiation device. For example, in case the irradiation device comprises a first optical unit with a plurality of optical elements and a second optical unit with a plurality of optical elements, the heat transfer circuit may comprise a first distribution line connected to at least one heat exchanger thermally coupled to the first optical unit and a second distribution line connected to at least one heat exchanger thermally coupled to the second optical unit which are configured to selectively direct the heat transfer fluid circulating in the heat transfer circuit through the heat exchangers thermally coupled to the first and the second optical unit. In other words, by such a configuration, a plurality of optical units may be connected in parallel in the heat transfer circuit so as to enable to selectively direct the heat transfer fluid thereto. Further, the heat transfer circuit may comprise at least one first control valve. For example, in case the heat transfer circuit comprises a plurality of distribution lines, the heat transfer circuit may comprise a plurality of first control valves each of which may be disposed in one of the plurality of distribution lines and may be configured to control the flow of the heat transfer fluid therethrough. It is, however, also conceivable to connect the plurality of optical units in series such that the heat transfer fluid, after flowing through a heat exchanger thermally coupled to a first optical unit, is directed to a heat exchanger thermally coupled to a second optical unit.

Further, the heat transfer circuit may be thermally coupled to the cooling energy source, in particular by means of a third heat exchanger arranged in a bypass line of the heat transfer circuit, so as to transfer the cooling energy generated by the cooling energy source to the at least one optical unit, in particular the plurality of optical elements of the at least one optical unit, of the irradiation device. Specifically, the bypass line may be connected in parallel to a portion of the heat transfer circuit accommodating the first heat exchanger thermally coupled to the heat source. Accordingly, the heat transfer circuit may comprise a second control valve disposed in the bypass line of the heat transfer circuit and a third control valve arranged in the portion of the heat transfer circuit which are configured to control the flow of the heat transfer fluid therethrough. Specifically, by controlling the operation of the at least one first control valve, the second control valve and the third control valve, the control unit may be configured to adjust the temperature of the at least one optical unit of the irradiation device.

The further heat transfer arrangement may comprise a further heat source configured to act in the shielding gas to be supplied to the process chamber so as to adjust, in particular to increase, the temperature thereof. In the further development, the further heat source may be provided in the form of the third heat exchanger. By such a configuration, waste heat generated in the heat transfer arrangement, in particular by the heat source, may be used to heat the shielding gas to be supplied to the process chamber. Accordingly, cooling energy provided by the shielding gas may be transferred to the at least one optical unit of the irradiation device. As a result, the overall efficiency of the apparatus can be improved.

Furthermore, the invention relates to a method of operating an apparatus, said apparatus being adapted to produce a three-dimensional work piece comprising a process chamber accommodating a carrier for receiving a raw material powder, an irradiation device for selectively irradiating electromagnetic or particle radiation onto the raw material powder applied onto the carrier in order to produce the work piece from said raw material powder by an additive layer construction method, the irradiation device comprising at least one radiation source and at least one optical unit with a plurality of optical elements, and a heat transfer arrangement configured to transfer heat generated by a heat source of the heat transfer arrangement to the at least one optical unit. The method comprises the step of controlling the heat transfer arrangement so as to adjust the temperature of the at least one optical unit of the irradiation device.

Figure 1:
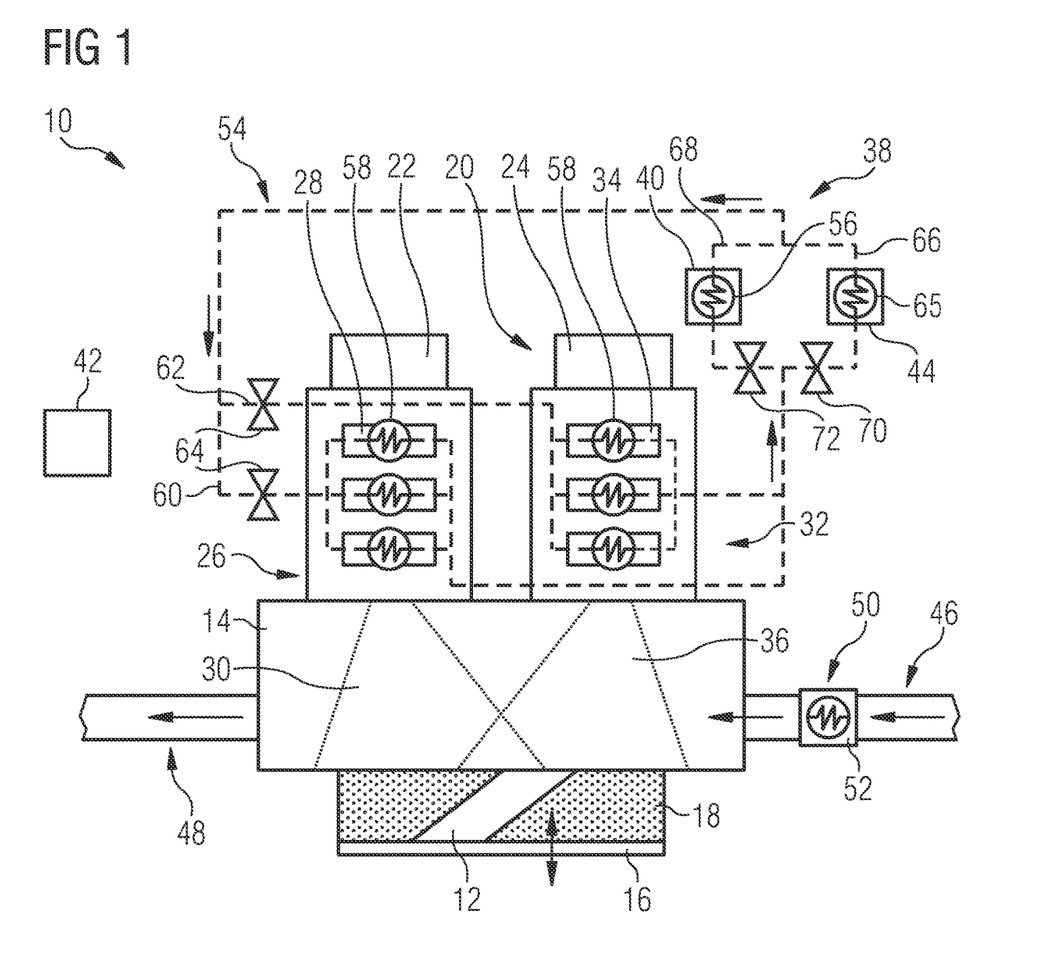
Figure 2:
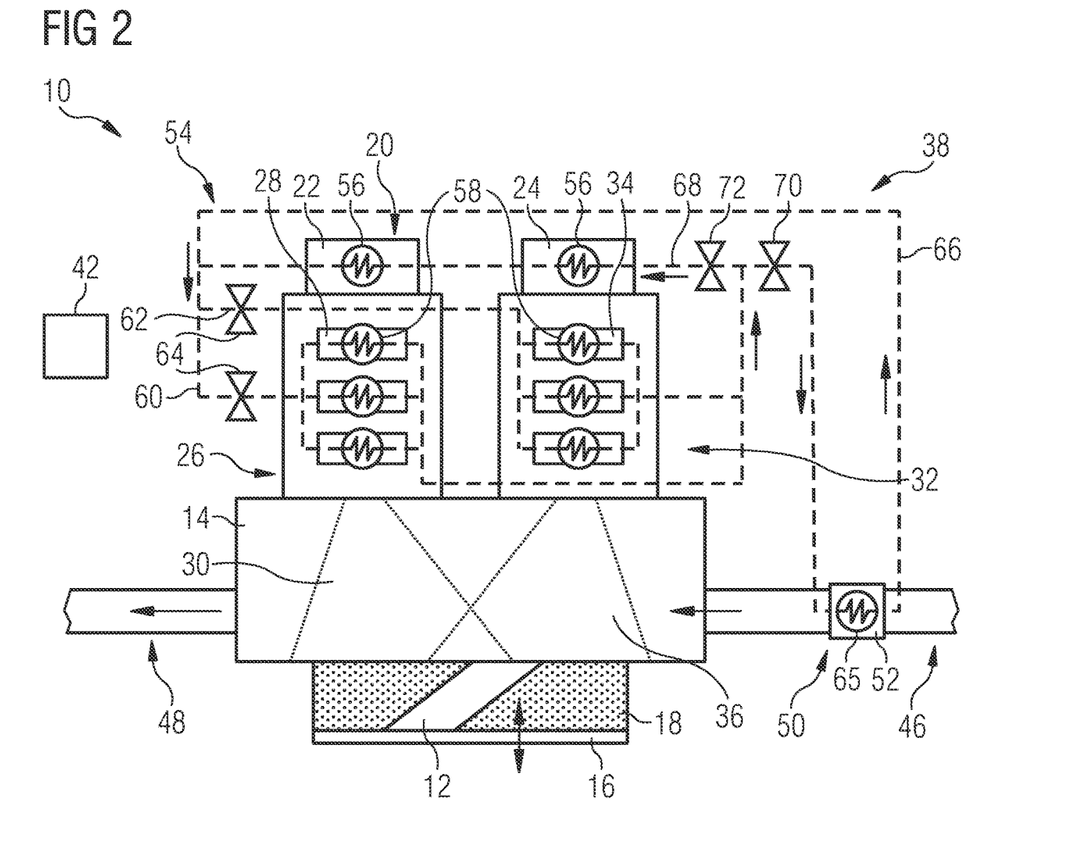

Preferred embodiments of the invention are explained in greater detail below with reference to the accompanying schematic drawings, in which:

FIG. 1 shows a schematic representation of an apparatus for producing three-dimensional work pieces according to a first embodiment, and FIG. 2 shows a schematic representation of an apparatus for producing free-dimensional work pieces according to a second embodiment.

FIG. 1 shows an apparatus 10 for producing a three-dimensional work piece 12 by an additive layering process. The apparatus 10 comprises a process chamber 14 is accommodating a carrier 16 for receiving a raw material powder 18. The process chamber 14 is sealed against the ambient atmosphere, i.e. against the environment surrounding the process chamber 14. A powder application device (not shown) serves to apply the raw material powder 18 onto the carrier 16. The carrier 16 is designed to be displaceable in a vertical direction so that, with increasing construction height of a work piece 12, as it is built up in layers from the raw material powder 18 on the carrier 16, the carrier 16 can be moved downwards in the vertical direction.

The apparatus 10 for producing the three-dimensional work piece 12 further comprises an irradiation device 20 for selectively irradiating electromagnetic or particle radiation, in particular laser radiation onto the raw material powder 18 applied onto the carrier 16 in order to produce the work piece 12 from said raw material powder 18 by an additive layer construction method. In particular, by means of the irradiation device 20, the raw material powder 18 on the carrier 16 may be subjected to electromagnetic or particle radiation in a site selective manner in dependence on the desired geometry of the component that is to be produced. The irradiation device 20 comprises a first radiation source 22 and a second radiation source 24 which may comprise a diode pumped Ytterbium fibre laser emitting laser light at a wavelength of approximately 1070 to 1080 nm.

The irradiation device 20 further comprises a first optical unit 26 with a plurality of optical elements 28 for guiding and processing a radiation beam 30 emitted by the first radiation source 22 and second optical unit 32 with a plurality of optical elements 34 for guiding and processing a radiation beam 36 emitted by the second radiation source 24. The plurality of optical elements 28 of the first optical unit 26 and the plurality of optical elements 34 of the second optical unit 32 may comprise a beam expander for expanding the radiation beam, a scanner and an object lens. Alternatively, the plurality of optical elements 28 of the first optical unit 26 and the plurality of optical elements 34 of the second optical unit 32 may comprise a beam expander including a focusing optic and a scanner unit. By means of the scanner unit, the position of the focus of the first and the second radiation beam 30, 36 both in the direction of the beam path and in a plane perpendicular to the beam path can to be changed and adapted.

The apparatus 10 further comprises a heat transfer arrangement 38 configured to transfer heat generated by a heat source 40 to the first and the second optical unit 26, 32 of the irradiation device 20. In the embodiment depicted in FIG. 1, the heat source 40 is provided in the form of a separate heater.

Further, the apparatus 10 is provided with a control unit 42 configured to control the heat transfer arrangement 38 so as to adjust a temperature of the first and the second optical unit 26, 32 of the irradiation device 20. The control unit 42 may be provided separately from or integrated into a central control unit of the apparatus 10.

Specifically, the control unit 42 is configured to control the heat transfer arrangement 38 such that, when the temperature of the first and the second optical unit 26, 32 of the irradiation device 20 falls below a temperature set value, the heat generated by the heat source 40 is transferred to the first and the second optical unit 26, 32 of the irradiation device 20 by means of the heat transfer arrangement 38 so as to raise the temperature of the first and the second optical unit 26, 32 of the irradiation device 20. The control unit 42 is further configured to control the heat transfer arrangement 38 such that, when the temperature of the first and the second optical unit 26, 32 of the irradiation device 20 exceeds or equals the temperature set value, the transfer of the heat generated by the heat source 40 to the first and the second optical unit 26, 32 of the irradiation device 20 is shut off.

The heat transfer arrangement 38 is further configured to transfer cooling energy generated by a cooling energy source 44 to the first and the second optical unit 26, 32 of the irradiation device 20. Accordingly, the control unit 42 is configured to control the heat transfer arrangement 38 such that, when the temperature of the first and the second optical unit 26, 32 of the irradiation device 20 exceeds or equals the temperature set value, the cooling energy generated by the cooling energy source 44 is transferred to the first and the second optical unit 26, 32 of the irradiation device 20 so as to adjust the temperature of the first and the second optical unit 26, 32 of the irradiation device 20 substantially to the temperature set value. As a result, by such a configuration, the apparatus 10 can be operated at stable operating conditions in order to meet high accuracy standards even over long operating periods.

In order to control the temperature of the first and the second optical unit 26, 32 of the irradiation device 20, the control unit 42 is configured to control the heat transfer arrangement 38 according to a feedback loop. Accordingly, the apparatus 10 comprises a first and a second temperature sensing means (not shown) which are configured to determine the temperature of the first and the second optical unit 26, 32 of the irradiation device 20. Specifically, the first and the second temperature sensing means are configured to transmit a control parameter to the control unit 42, wherein the control parameter is indicative of the temperature of the first and the second optical unit 26, 32 of the irradiation device 20.

Further, the apparatus 10 is provided with a shielding gas supply system 46, 48 which is configured to supply a shielding gas to the process chamber 14. The shielding gas supply system 46, 48 comprises a gas supply line 46 for supplying gas to the process chamber 14 and a gas discharge line 48 for discharging gas from the process chamber 14. The gas supplied to the process chamber via the gas supply line 46 may be an inert gas such as, for example, Argon, Nitrogen or the like. It is, however, also conceivable to supply the process chamber 14 with air via the gas supply line 46. The gas is conveyed into the process chamber 14 via the gas supply line 46 by means of a suitable conveying device such as, for example, a compressor or a blower (not shown) which is arranged in the gas supply line 46 upstream of the process chamber 14. En this context, the term "upstream" refers to a flow direction of the shielding gas flowing through the gas supply line 46.

Further, the gas discharge line 48 serves to discharge gas containing particulate impurities generated in the process chamber 14 upon irradiating the raw material powder 18 on the carrier 16 with electromagnetic or particle radiation from the process chamber 14. The gas discharge line 48 may be connected to the gas supply line 46 so as to define a recirculation system to which gas exiting the process chamber 14 via the gas discharge line 48 is recirculated into the process chamber 14 via the gas supply line 46. In order to remove particulate impurities from gas discharged from the process chamber 14 via the gas discharge line 48 prior to recirculating the gas into the process chamber 14 via the gas supply line 46, a suitable filter arrangement (not shown) may be provided in the recirculation system.

Furthermore, the apparatus 10 comprises a further heat transfer arrangement 50 configured to transfer heat to the shielding gas to be supplied to the process chamber 14. For generating heat to be transferred to the shielding gas to be supplied to the process chamber 14, the further heat transfer arrangement 50 comprises a further heat source 52 configured to act on the shielding gas so as to raise the temperature thereof. The further heat source 52 is provided in the form of a further separate heater which is arranged in the gas supply line 46 and is configured to raise the temperature of the shielding gas prior to entering the process chamber 14. Additionally, the further heat transfer arrangement 50 may be configured to transfer cooling energy generated by a further cooling energy source to the shielding gas to be supplied to the process chamber 14, wherein the further cooling energy source may be arranged in the gas supply line 48.

The control unit 42 is further configured to control the further heat transfer arrangement 50 so as to adjust the temperature of the shielding gas to be supplied to the process chamber 14. Specifically, the control unit 42 is configured to control the further heat transfer arrangement 50 such that, when a temperature prevailing in the process chamber 14 falls below a further temperature set value, the temperature of the shielding gas to be supplied to the process chamber is raised and, when the temperature prevailing in the process chamber 14 exceeds the further temperature set value, the temperature of the shielding gas to be supplied to the process chamber 14 is lowered.

In order to control the temperature within the process chamber, the control unit is configured to control the further heat transfer arrangement 50 according to a feed-back loop. Accordingly, the apparatus 10 comprises a third temperature sensing means (not shown) which is configured to determine a temperature prevailing in the process chamber 14. Specifically, the third temperature sensing means is configured to transmit a control parameter to the control unit 42, wherein the control parameter is indicative of a temperature prevailing in the process chamber 14.

As a result, the control unit 42 of the apparatus 10 is configured to control both an adjustment of the temperature of the first and the second optical unit 26, 32 of the irradiation device 20 and an adjustment of the temperature prevailing in the process chamber 14, thereby allowing the production of particularly high-quality three-dimensional work pieces.

Specifically, the temperature set value for the temperature of the first and the second optical unit 26, 32 of the irradiation device 20 is greater than the further temperature set value for the temperature prevailing in the process chamber 14. Alternatively, the temperature set value for the temperature of the first and the second optical unit 26, 32 of the irradiation device 20 may equal the further temperature set value for the temperature prevailing in the process chamber 14.

Further, the control unit 42 is configured to control the heat transfer arrangement 38 and the further heat transfer arrangement 50 such that a gradient of the temperature of the first and the second optical unit 26, 32 of the irradiation device 20 substantially equals the gradient of the temperature prevailing in the process chamber 14.

Still further, the control unit 42 is configured to control the heat transfer arrangement 38 such that the temperature of the first and the second optical unit 26, 32 of the irradiation device 20 is raised to the temperature set value when the apparatus 10 is in a warm up mode and the temperature of the first and the second optical unit 26, 32 of the irradiation device 20 is maintained substantially constant at the temperature set value when the apparatus 10 is in a processing mode. Accordingly, the control unit 42 is configured to control the further heat transfer arrangement 50 such that the temperature prevailing in the process chamber 14 is raised to the further temperature set value when the apparatus 10 is in its warm up mode and the temperature prevailing in the process chamber 14 is maintained substantially constant at the further temperature set value when the apparatus 10 is in its processing mode.

More specifically, the heat transfer arrangement 38 comprises a heat transfer circuit 54 in which a heat transfer fluid circulates as depicted in FIG. 1. The heat transfer circuit 54 comprises a convening device (not shown), such as a pump, for convening the heat transfer fluid through the heat transfer circuit 54. Further, the heat transfer circuit 54 is thermally coupled to the heat source 40 by means of a first heat exchanger 56 and to the first and the second optical unit 26, 32 of the irradiation device 20 by means of a plurality of second heat exchangers 58 so as to transfer the heat generated by the heat source 40 to the plurality of optical elements 28, 34 of the first and the second optical unit 26, 32. In particular, to each of the plurality of optical elements 28, 34 of the first and the second optical unit 26, 32, one separate second heat exchanger 58 is connected.

The heat transfer circuit 54 further comprises a first distribution line 60 connected to the second heat exchangers 58 connected to the plurality of optical elements 28 of the first optical unit 26 and a second distribution line 62 connected to the second heat exchanger 58 connected to the plurality of optical elements 34 of the second optical unit 32. The first and the second distribution line 60, 62 are configured to selectively direct the heat transfer fluid circulating in the heat transfer circuit 54 through the plurality of second heat exchangers 58 thermally coupled to the plurality of optical elements 28, 34 of the first and the second optical unit 26, 32. Specifically, by means of the first and the second distribution line 60, 62, the second heat exchangers 58 connected to the plurality of optical elements 28 of the first optical unit 26 and the second heat exchangers 58 connected the plurality of optical elements 34 is of the second optical unit 32 are connected in parallel in the heat transfer circuit 54.

Further, in each of the first and the second distribution line 50, 52, a first control valve 64 is provided which is configured to control the flow of the heat transfer fluid therethrough. In this way, the first control valves 64, which are controlled by the control unit 42, enable to selectively direct the heat transfer fluid to the plurality of optical elements 28, 34 of the first and the second optical unit 26, 32.

The heat transfer circuit 54 is thermally coupled to the cooling energy source 44 by means of a third heat exchanger 65 arranged in a bypass line 66 of the heat transfer circuit 54 so as to transfer cooling energy generated by the cooling energy source 44 to the plurality of optical elements 28, 34 of the first and the second optical unit 26, 32. Specifically, the bypass line 66 is connected in parallel to a portion 68 of the heat transfer circuit 54 accommodating the first heat exchanger 56 thermally coupled to the heat source 40. Further, the heat transfer circuit 54 comprises a second control valve 70 provided in the bypass line 66 and a third control valve 72 provided in the portion 68 of the heat transfer circuit 54 which are controlled by the control unit 42 and configured to control the flow of the heat transfer fluid therethrough. Specifically, the control unit 42 is configured to provide control signals to the first to third control valves 68-70 in order to adjust the temperature of the first and the second optical unit 26, 32 of the irradiation device 20. Furthermore, the heat transfer circuit 54 may comprise a further bypass line with a further control valve for bypassing both the portion 68 of the heat transfer circuit 54 and the bypass line 68 such that the heat transfer fluid may circulate through the heat transfer circuit 54 without being directed through the first and the third heat exchanger 56, 65.

FIG. 2 shows an apparatus 10 for producing three-dimensional work pieces according to a second embodiment. Compared to the first embodiment of the apparatus 10 depicted in FIG. 1, in the apparatus 10 shown in FIG. 2, the heat source of the heat transfer arrangement 38 for generating heat to be transferred to the first and the second optical unit 26, 32 of the irradiation device 20 is provided in the form of the first and the second radiation source 22, 24. To that end, the further heat source of the further heat transfer arrangement 50 is provided in the form of the third heat exchanger 65. By such a configuration, waste heat generated by the first and the second radiation source 22, 24 is used to heat both the first and the second optical unit 26, 32 of the irradiation device 20 and the shielding gas to be supplied to the process chamber 14, thereby improving the overall efficiency of the apparatus 10,

The invention claimed is:

1. An apparatus for producing a three-dimensional work piece, the apparatus comprising:
    a process chamber accommodating a carrier for receiving a raw material powder,
    an irradiation device for selectively irradiating electromagnetic or particle radiation onto the raw material powder applied onto the carrier in order to produce the work piece from said raw material powder by an additive layer construction method, the irradiation device comprising at least one radiation source and at least one optical unit with a plurality of optical elements;
    a heat transfer arrangement configured to transfer heat generated by a heat source to the at least one optical unit of the irradiation device; and
    a control unit configured to control the heat transfer arrangement so as to adjust a temperature of the at least one optical unit of the irradiation device, wherein the heat transfer arrangement comprises a heat transfer circuit in which a heat transfer fluid circulates and which is configured to be thermally coupled to the heat source and to the at least one optical unit of the irradiation device so as to transfer the heat generated by the heat source to the at least one optical unit of the irradiation device,
    wherein the heat transfer arrangement is further configured to transfer cooling energy generated by a cooling energy source to the at least one optical unit of the irradiation device.

2. The apparatus according to claim 1,
    wherein the control unit is configured to control the heat transfer arrangement such that, when the temperature of the at least one optical unit of the irradiation device falls below a temperature set value, the heat generated by the heat source is transferred to the at least one optical unit of the irradiation device so as to raise the temperature of the at least one optical unit of the irradiation device, and, when the temperature of the at least one optical unit of the irradiation device exceeds or equals the temperature set value, the transfer of the heat generated by the heat source to the at least one optical unit of the irradiation device is shut off.

3. The apparatus according to claim 2,
    wherein the control unit is configured to control the heat transfer arrangement such that, when the temperature of the at least one optical unit of the irradiation device exceeds or equals the temperature set value, the cooling energy generated by the cooling energy source is transferred to the at least one optical unit of the irradiation device so as to adjust the temperature of the at least one optical unit of the irradiation device substantially to the set temperature value.

4. The apparatus according to claim 1, further comprising:
a shielding gas supply system configured to supply a shielding gas to the process chamber; and
a further heat transfer arrangement configured to transfer heat to the shielding gas to be supplied to the process chamber, wherein
the control unit is configured to control the further heat transfer arrangement so as to adjust the temperature of the shielding gas to be supplied to the process chamber.

5. The apparatus according to claim 4,
wherein the control unit is configured to control the further heat transfer arrangement such that, when a temperature prevailing in the process chamber falls below a further temperature set value, the temperature of the shielding gas to be supplied to the process chamber is raised and, when the temperature prevailing in the process chamber exceeds the further temperature set value, the temperature of the shielding gas to be supplied to the process chamber is lowered.

6. The apparatus according to claim 5,
wherein the temperature set value for the temperature of the at least one optical unit of the irradiation device equals or is greater than the further temperature set value for the temperature prevailing in the process chamber.

7. The apparatus according to claim 4,
wherein the control unit is configured to control the heat transfer arrangement and the further heat transfer arrangement such that a gradient of the temperature of the at least one optical unit of the irradiation device substantially equals a gradient of the temperature prevailing in the process chamber.

8. The apparatus according to claim 4,
wherein the control unit is configured to control the heat transfer arrangement such that the temperature of the at least one optical unit of the irradiation device is raised to the temperature set value when the apparatus is in a warm up mode and the temperature of the at least one optical unit of the irradiation device is maintained substantially constant at the temperature set value when the apparatus is in a processing mode; and/or
wherein the control unit is configured to control the further heat transfer arrangement such that the temperature prevailing in the process chamber is raised to the further temperature set value when the apparatus is in its warm up mode and the temperature prevailing in the process chamber is maintained substantially constant at the further temperature set value when the apparatus is in its processing mode.

9. The apparatus according to claim 1,
wherein the heat transfer arrangement is thermally coupled to the heat source by a first heat exchanger and the at least one optical unit of the irradiation device by at least one second heat exchanger so as to transfer the heat generated by the heat source to the at least one optical unit of the irradiation device.

10. The apparatus according to claim 9,
wherein the heat transfer circuit comprises at least one distribution line connected to the at least one second heat exchanger and configured to selectively direct the heat transfer fluid circulating in the heat transfer circuit through the at least one second heat exchanger thermally coupled to the at least one optical unit of the irradiation device.

11. The apparatus according to claim 1,
wherein the heat transfer circuit is further thermally coupled to the cooling energy source by a third heat exchanger arranged in a bypass line of the heat transfer circuit so as to transfer the cooling energy generated by the cooling energy source to the at least one optical unit of the irradiation device.

12. The apparatus according to claim 11,
wherein the further heat transfer arrangement comprises a further heat source configured to act on the shielding gas to be supplied to the process chamber so as to adjust the temperature thereof, wherein the further heat source is provided in the form of the third heat exchanger.

13. A method of operating an apparatus adapted to produce a three-dimensional work piece, the apparatus comprising:
a process chamber accommodating a carrier for receiving a raw material powder;
an irradiation device for selectively irradiating electromagnetic or particle radiation onto the raw material powder applied onto the carrier in order to produce the work piece from said raw material powder by an additive layer construction method, the irradiation device comprising at least one radiation source and at least one optical unit with a plurality of optical elements;
a heat transfer arrangement configured to transfer heat generated by a heat source of the heat transfer arrangement to the at least one optical unit of the irradiation device; and
the method comprises: controlling the heat transfer arrangement so as to adjust the temperature of the at least one optical unit of the irradiation device,
wherein the heat transfer arrangement comprises a heat transfer circuit in which a heat transfer fluid circulates and which is configured to be thermally coupled to the heat source and to the at least one optical unit of the irradiation device so as to transfer the heat generated by the heat source to the at least one optical unit of the irradiation device,
wherein the heat transfer arrangement is further configured to transfer cooling energy generated by a cooling energy source to the at least one optical unit of the irradiation device.

* * * * *